(12) United States Patent
Sharma et al.

(10) Patent No.: US 11,433,722 B2
(45) Date of Patent: Sep. 6, 2022

(54) TRAILER AND VEHICLE COLLISION DETECTION AND RESPONSE DURING AUTOHITCH MANEUVERING

(71) Applicant: Ford Global Technologies, LLC, Dearborn, MI (US)

(72) Inventors: Arnav Sharma, Canton, MI (US); Douglas Rogan, Mountain View, CA (US); Luke Niewiadomski, Dearborn, MI (US); Shannon Brooks-Lehnert, Ann Arbor, MI (US); Roger Arnold Trombley, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 375 days.

(21) Appl. No.: 16/221,818

(22) Filed: Dec. 17, 2018

(65) Prior Publication Data

US 2020/0189336 A1 Jun. 18, 2020

(51) Int. Cl.
*B60D 1/36* (2006.01)
*B60D 1/24* (2006.01)
(Continued)

(52) U.S. Cl.
CPC ............ *B60D 1/366* (2013.01); *B60D 1/245* (2013.01); *B60D 1/242* (2013.01); *B60D 1/62* (2013.01); *B60Q 9/008* (2013.01); *B60T 7/20* (2013.01); *B60T 8/172* (2013.01); *B60T 8/1708* (2013.01); *B60T 2201/022* (2013.01); *B60T 2230/08* (2013.01); *B60W 50/14* (2013.01); *B60W 2050/146* (2013.01); *B60W 2300/14* (2013.01)

(58) Field of Classification Search
CPC ........ B60D 1/366; B60D 1/245; B60D 1/242; B60D 1/62; B60D 1/36; B60Q 9/008; B60T 7/20; B60T 8/1708; B60T 8/172; B60T 2201/022; B60T 2230/08; B60T 2260/04; B60T 7/22; B60W 50/14; B60W 2050/146; B60W 2300/14; B60W 30/18036; B60W 2530/203; B60W 10/10; B60W 10/18; B60W 10/20; B60W 40/105; B60W 40/107; B60W 40/112; B60W 2520/10; B60W 2520/105; B60W 2710/1005; B60W 2710/18; B60W 2710/20
USPC ........................................ 701/70, 1
See application file for complete search history.

(56) References Cited

U.S. PATENT DOCUMENTS

| 6,516,925 B1 * | 2/2003 | Napier | B60L 7/10 |
| | | | 188/112 A |
| 8,406,952 B2 * | 3/2013 | Nakayama | B60T 7/122 |
| | | | 180/170 |

(Continued)

FOREIGN PATENT DOCUMENTS

| DE | 102010-002680 | * | 9/2011 | |
| DE | 102010002680 A1 * | 9/2011 | ............. G01C 21/26 |

*Primary Examiner* — Muhammad Shafi
(74) *Attorney, Agent, or Firm* — Gregory P. Brown; Price Heneveld LLP

(57) ABSTRACT

A vehicle system includes a vehicle brake system, an accelerometer mounted on the vehicle, and a controller. The controller receives a first signal from the accelerometer and, during reversing of the vehicle in a longitudinal direction, transmits an actuation signal to the vehicle brake system when the first signal from the accelerometer indicates a deceleration in the longitudinal direction above a predetermined rate within a predetermined time interval.

20 Claims, 12 Drawing Sheets

(51) Int. Cl.
 *B60D 1/62* (2006.01)
 *B60T 7/20* (2006.01)
 *B60W 50/14* (2020.01)
 *B60T 8/17* (2006.01)
 *B60T 8/172* (2006.01)
 *B60Q 9/00* (2006.01)

(56) References Cited

U.S. PATENT DOCUMENTS

| | | |
|---|---|---|
| 9,457,632 B1 | 10/2016 | Windeler et al. |
| 9,550,399 B2 | 1/2017 | Jones et al. |
| 2005/0246081 A1 | 11/2005 | Bonnet et al. |
| 2006/0095189 A1* | 5/2006 | Kissel ............... B60T 8/1708 701/70 |
| 2010/0007200 A1* | 1/2010 | Pelosse ............... B60T 7/20 303/7 |
| 2015/0081184 A1* | 3/2015 | Braunberger ........ B60T 7/20 701/70 |
| 2016/0052548 A1* | 2/2016 | Singh ............... B62D 15/028 701/41 |
| 2016/0101765 A1* | 4/2016 | Reed .................. B60T 7/22 701/70 |
| 2018/0081370 A1* | 3/2018 | Miller ................. B60D 1/62 |
| 2018/0210461 A1* | 7/2018 | Cremona ........... G05D 1/0293 |
| 2019/0094872 A1* | 3/2019 | Li ........................ B60D 1/36 |
| 2019/0135059 A1* | 5/2019 | Niewiadomski ..... B60D 1/36 |

* cited by examiner

TRAILER AND VEHICLE COLLISION DETECTION AND RESPONSE DURING AUTOHITCH MANEUVERING

FIELD OF THE INVENTION

The present disclosure generally relates to a system for assisting in a vehicle-trailer hitching operation. In particular, the present disclosure relates to a system for detecting a potential collision between a vehicle and trailer during a hitching operation and related applications.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE INVENTION

According to one aspect of the present invention, a vehicle system includes a vehicle brake system, an accelerometer mounted on the vehicle, and a controller. The controller receives a first signal from the accelerometer and, during reversing of the vehicle in a longitudinal direction, transmits an actuation signal to the vehicle brake system when the first signal from the accelerometer indicates a deceleration in the longitudinal direction above a predetermined rate within a predetermined time interval.

Embodiments of the first aspect of the invention can include any one or a combination of the following features:
- the controller calculates a time derivative of the acceleration signal during reversing of the vehicle and monitors the time derivative on an ongoing basis and determines that the signal from the accelerometer indicates a deceleration in the longitudinal direction above the predetermined rate by the time derivative reaching a predetermined value;
- the predetermined value of the time derivative is between 5 meters per second cubed and 10 meters per second cubed;
- the controller interprets the deceleration in the longitudinal direction above a predetermined rate within a predetermined time interval as a reversing collision indication, and the controller further monitors at least one additional vehicle state affecting the signal from the accelerometer for an indicator of false positive detection;
- the accelerometer outputs a second signal corresponding with acceleration of the vehicle in a vertical direction, and the controller receives the second signal and monitors for the at least one additional vehicle state by monitoring the second signal for an indication of a deceleration in the longitudinal direction above a predetermined rate within the predetermined time interval;
- the system further includes at least one of a transmission system and an electronic parking brake, and the at least one additional vehicle state includes at least one of the transmission system being in park, the electronic parking brake being active, or the vehicle brake system being engaged above a predetermined threshold;
- the actuation signal calls for at least one of a braking torque rate or a braking torque strength above a respective predetermined threshold;
- the controller continues to transmit the actuation signal to the vehicle brake system until the vehicle is brought to a stop;
- the system further includes an electronic parking brake, and the controller determines that the vehicle is brought to a stop and causes application of the electronic parking brake;
- the controller further identifies a trailer coupler within a specified area relative to the vehicle and outputs a steering signal to the vehicle during reversing of the vehicle to cause the vehicle to steer to align a hitch ball of the vehicle with the coupler;
- the controller further continuously monitors a distance between a rear of the vehicle and the coupler while outputting the steering signal to the vehicle, transmits the actuation signal to the vehicle brake system when the first signal from the accelerometer indicates the deceleration in the longitudinal direction above the predetermined rate within the predetermined time interval within a reverse collision detection function, and implements the reverse collision detection function only when the distance between the rear of the vehicle and the coupler is within one meter; and
- the controller infers the first signal from the accelerometer indicating the deceleration in the longitudinal direction above the predetermined rate within the predetermined time interval within the reverse collision detection function as a collision between the hitch ball and the coupler.

According to another aspect of the present invention, a vehicle hitching assistance system includes a hitch mounted on the vehicle, a vehicle brake system, a vehicle steering system, an accelerometer mounted on the vehicle, and a controller. The controller identifies a trailer coupler within a specified area relative to the vehicle, outputs a steering signal to the vehicle steering system to steer to align a hitch ball of the vehicle with the coupler, receiving a first signal from the accelerometer, and during reversing of the vehicle in a longitudinal direction, transmits an actuation signal to the vehicle brake system when the first signal from the accelerometer indicates a deceleration in the longitudinal direction above a predetermined rate within a predetermined time interval.

According to another aspect of the present invention, a method for controlling a vehicle during reversing includes receiving a first signal from an accelerometer mounted with the vehicle and, during reversing of the vehicle in a longitudinal direction, transmitting an actuation signal to a vehicle brake system when the first signal from the accelerometer indicates a deceleration in the longitudinal direction above a predetermined rate within a predetermined time interval.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
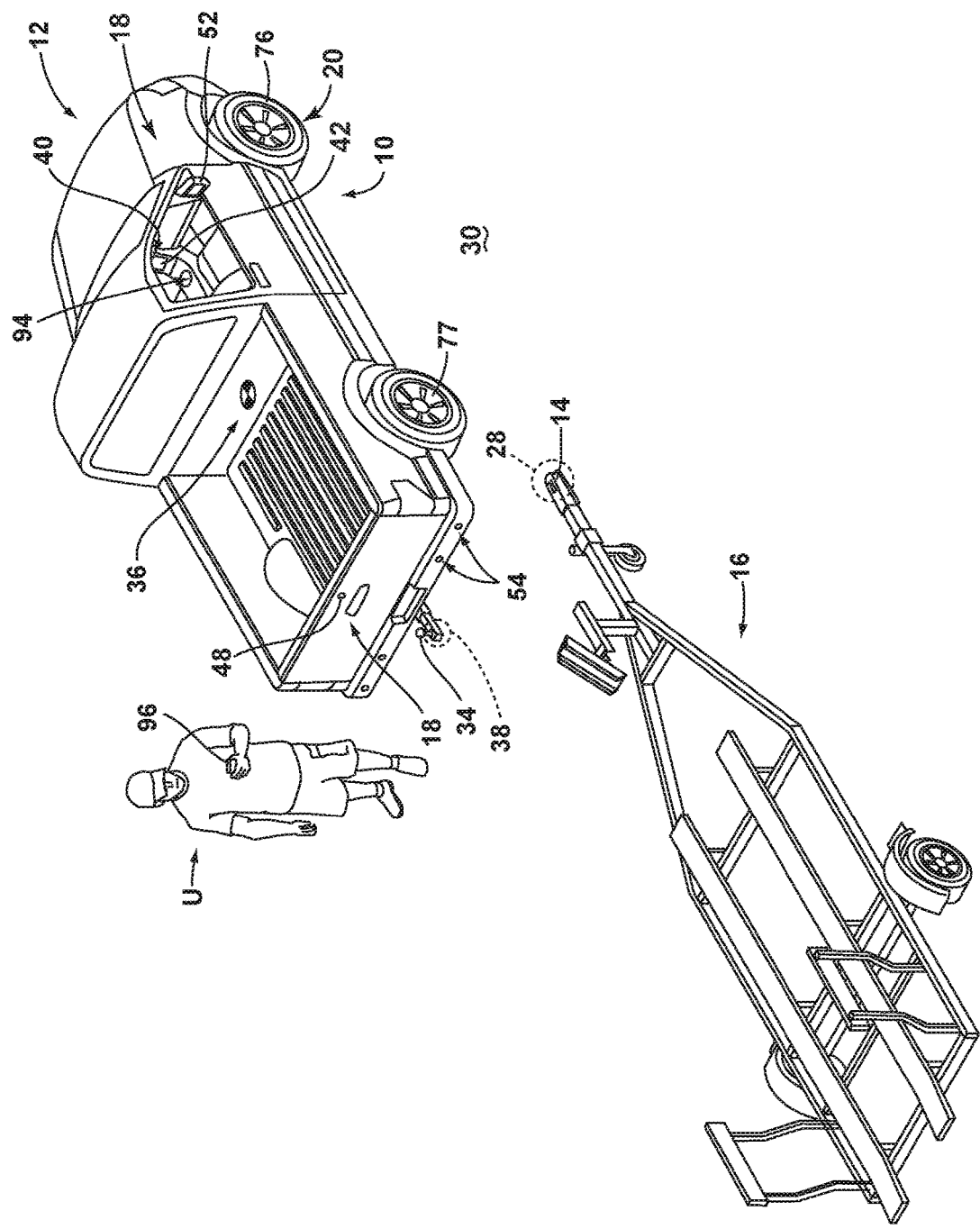
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-12, reference numeral 10 designates a control system for a vehicle 12. The system 10 includes a vehicle brake system 70, an accelerometer 90 mounted on the vehicle 12, and a controller 26. The controller 26 receives a first signal from the accelerometer 90 and, during reversing of the vehicle 12 in a longitudinal direction, transmits an actuation signal to the vehicle brake system 70 when the first signal from the accelerometer indicates a deceleration in the longitudinal direction above a predetermined rate within a predetermined time interval. In one aspect the control system may be a hitch assistance system (also referred to as a "hitch assist" system or a "hitching assistance" system) for assisting in aligning a hitch ball 34 of the vehicle 12 with the coupler 14 of a trailer 16. In this respect, the controller 26 may further output a steering signal to the vehicle 12 to cause the vehicle 12 to steer to align the hitch ball 34 of the vehicle 12 with the coupler 14.

Figure 2:
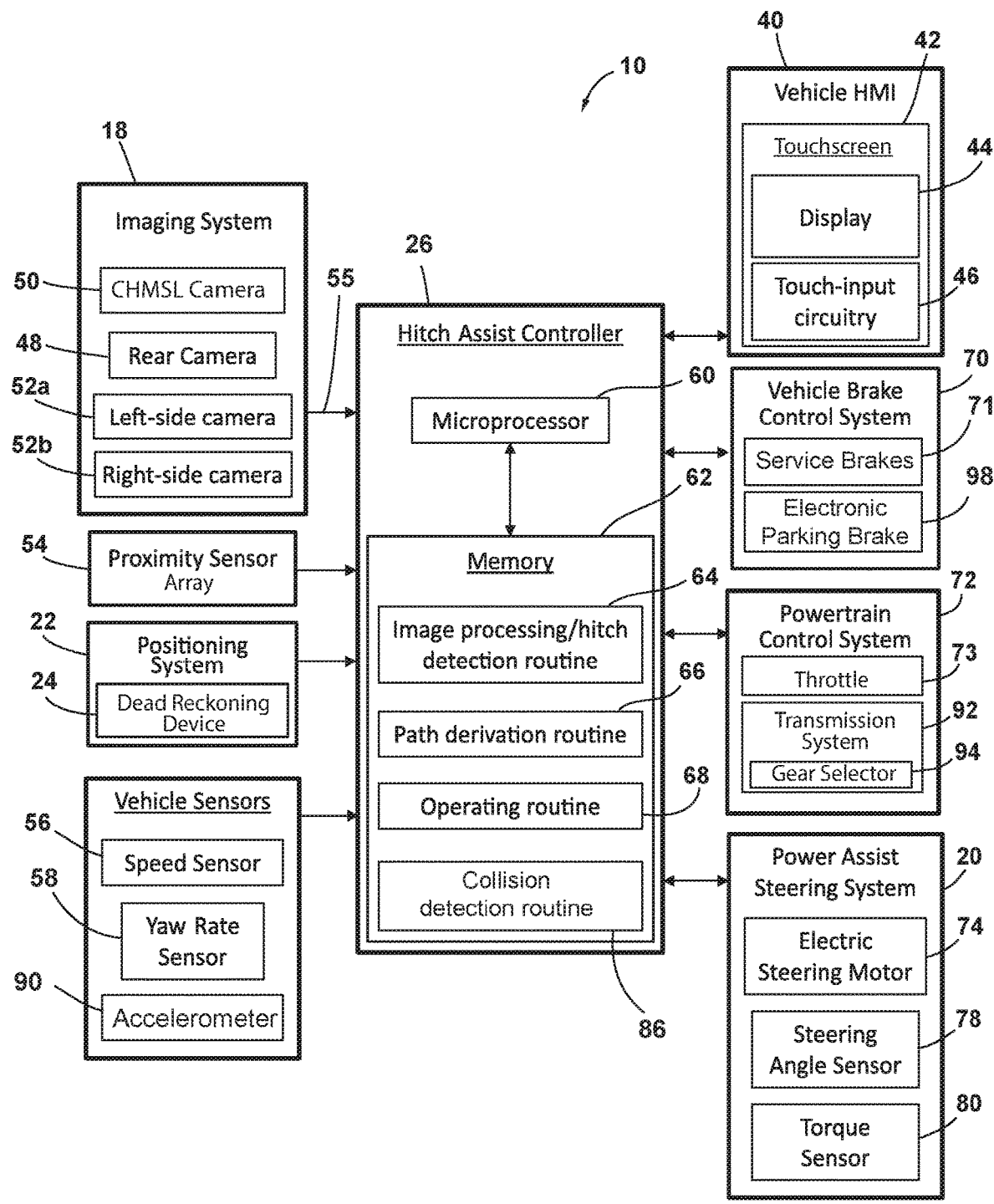
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle S. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position (e.g., based on the distance $D_h$ and angle $\alpha_h$) of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle S. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
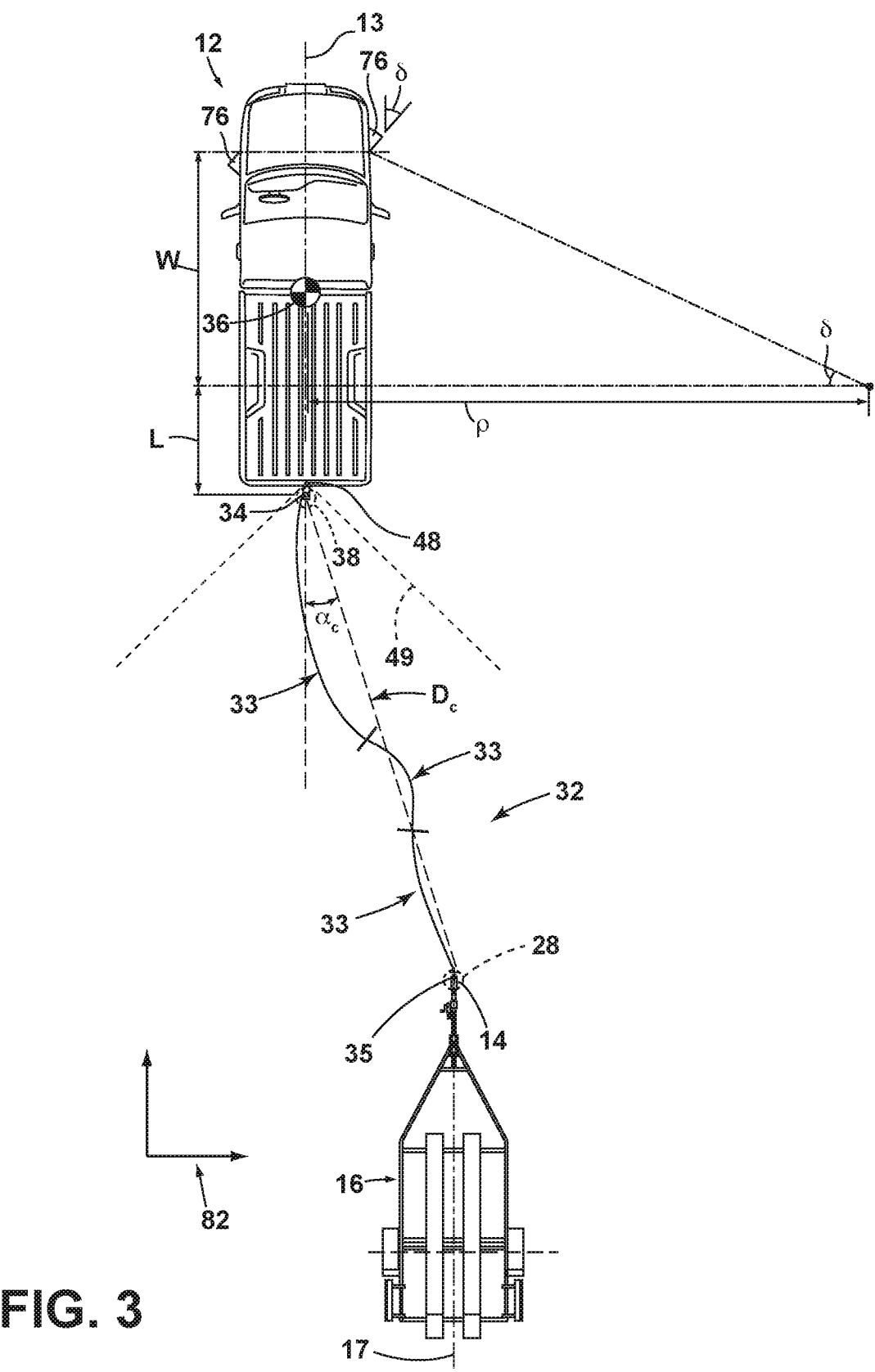
FIG. 3 is an overhead schematic view of a vehicle during a step of the alignment sequence with the trailer.
Figure 4:
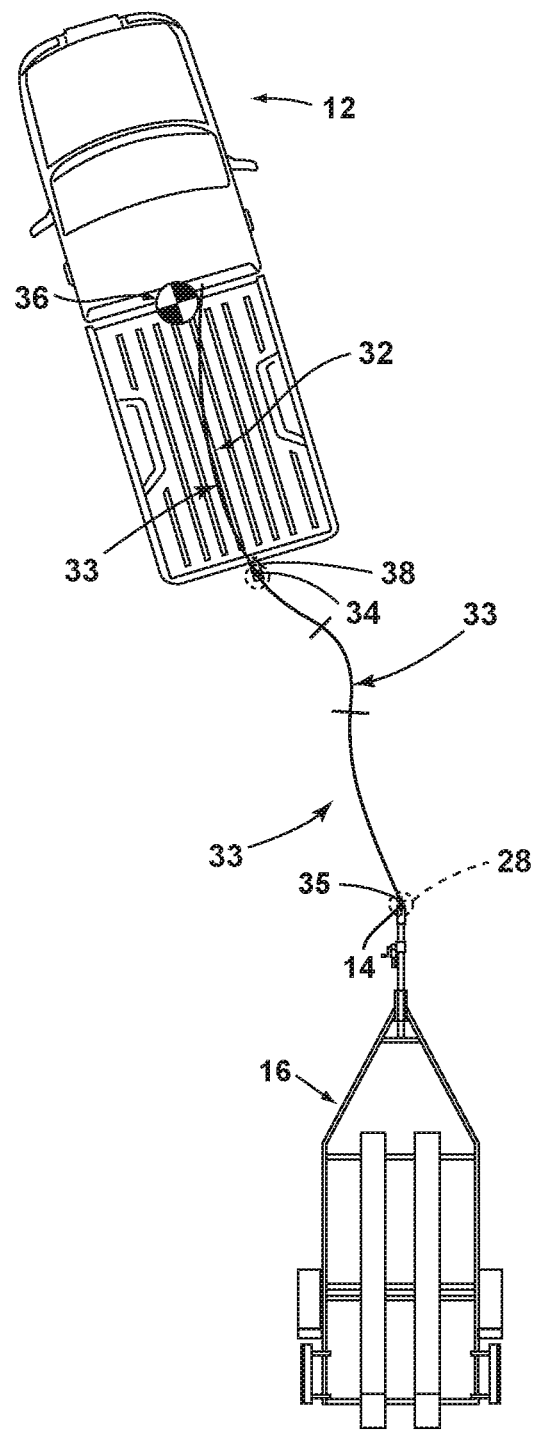
FIG. 4 is an overhead schematic view of the vehicle during a subsequent step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate γδ, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for a collision with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing 64 routine and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CMHSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which may correspond with rear camera 48, center high-mount stop light (CMHSL) camera 50, and side-view cameras 52a and 52b, respectively. In this manner, image data from two or more of the cameras can be combined in image processing routine 64, or in another dedicated image processor within imaging system 18, into a single image. In an extension of such an example, the image data can be used to derive stereoscopic image data that can be used to reconstruct a three-dimensional scene of the area or areas within overlapped areas of the various fields of view 49, 51, 53a, 53b, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36.

The image processing routine 64 can be specifically programmed or otherwise configured to locate coupler 14 within image data. In an example, the image processing routine 64 can first attempt to identify any trailers 16 within the image data, which can be done based on stored or otherwise known visual characteristics of trailer 16, of an number of different types, sizes or configurations of trailers compatible with system 10, or trailers in general. Controller 26 can seek confirmation from the user that the identification of the trailer 16 is accurate and is the correct trailer for which to complete an automated hitching operation, as described further below. After the trailer 16 is identified, controller 26 may then identify the coupler 14 of that trailer 16 within the image data based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data, as well as the positioning of coupler 14 relative to such a marker so that the location 28 of coupler 14 can be determined based on the marker location. Additionally or alternatively, controller 26 may seek confirmation of the determined coupler 14, via a prompt on touchscreen 44. If the coupler 14 determination is not confirmed, further image processing may be provided, or user-adjustment of the position 28 of coupler 14 may be facilitated, either using touchscreen 44 or another input to allow the user to move the depicted position 28 of coupler 14 on touchscreen 44, which controller 26 uses to adjust the determination of position 28 of coupler 14 with respect to vehicle 12 based on the above-described use of image data.

In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data makes it possible to accurately identify trailer 16, but at which the coupler 14 cannot be precisely identified. In this manner, initial rearward movement of vehicle 12 can allow for calibration of various system 12 inputs or measurements that can improve the accuracy of distance measurements, for example, that can help make coupler 14 identification more accurate. Similarly, movement of vehicle 12 resulting in a change to the particular image within the data that can improve the resolution or move the coupler 14 relative to the remaining portions of trailer 16 such that it can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 44, for example, image processing routine 64 can identify coupler 14 within the image data and at least attempt to estimate the position 28 of coupler 14 relative to hitch ball 34 using the image data in accordance with one of the examples discussed above to determine a distance $D_c$ to coupler 14 and an angle $\alpha_c$ of offset between coupler 14 and the longitudinal axis of vehicle 12. Image processing routine 64 can also be configured to identify the trailer 16 overall and can use the image data of trailer 16, alone or in combination with the image data of coupler 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without collision between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction. In various examples, such as when the length L of trailer 16 is known, the angular range may be greater, when permitted, or may be less, depending on the desired tolerance of system 10.

Figure 5:
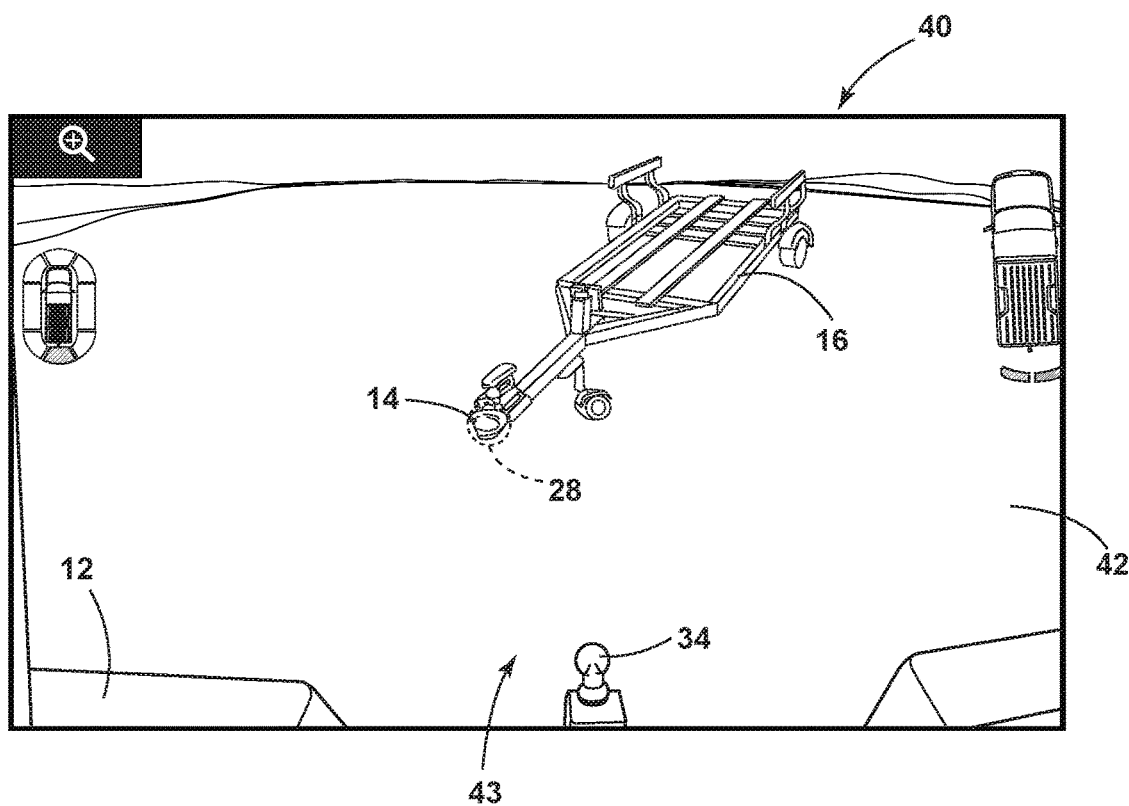
FIG. 5 is a depiction of an image received from a vehicle camera during the alignment sequence step of FIG. 4.

Continuing with reference to FIG. 5 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as the drawbar length L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta}, \tag{1}$$

in which the wheelbase W is fixed and the steering angle δ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{1}{W\tan\delta_{max}}. \quad (2)$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement Δx of coupler 14 in a driving direction toward vehicle 12 by determining the movement of coupler 14 in the vertical direction Δy that will be needed to receive hitch ball 34 within coupler 14. Such functionality is discussed further in co-pending, commonly-assigned U.S. patent application Ser. Nos. 14/736,391 and 16/038,462, the entire disclosures of which are hereby incorporated by reference herein.

As discussed above, once the desired path 32, including endpoint 35, has been determined using either of the offset determination schemes discussed above, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle δ, as dictated by path 32, depending on the position of vehicle 12 therealong. It is additionally noted that in an embodiment, the path 32 may comprise a progression of steering angle δ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from smartphone 96, can be fine-tuned once the image processing routine 64 can identify coupler 14 in the image data, with continued updates for path 32 being similarly derived as the image data becomes increasingly clear during the approach toward trailer 16. It is further noted that, until such a determination can be made, the dead reckoning device 24 can be used to track the location of vehicle 12 in its movement along path 32 toward the initially-derived endpoint 35.

Figure 6:
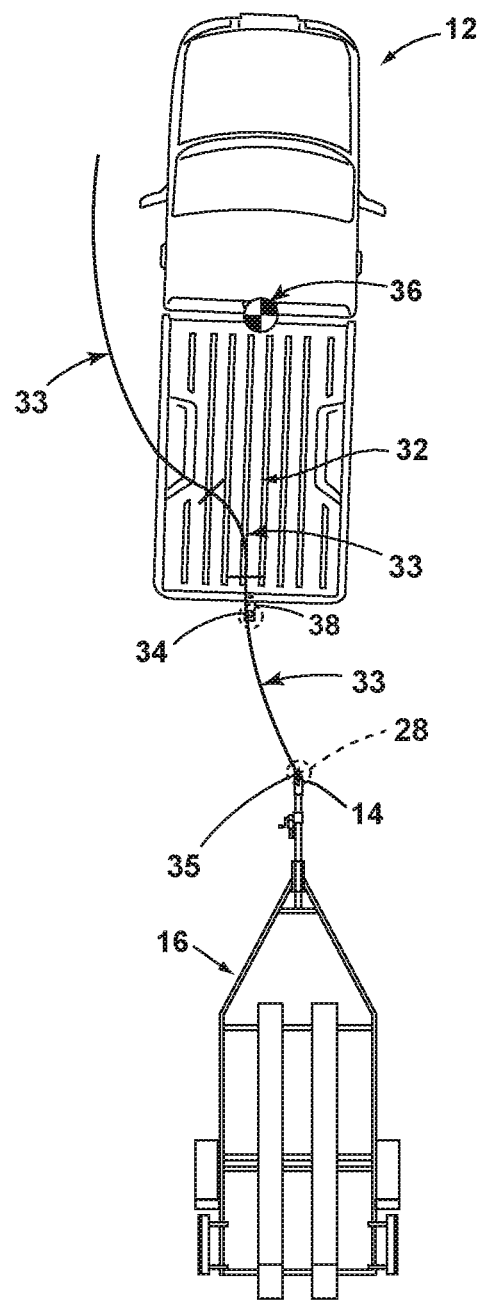
FIG. 6 is an overhead schematic view of the vehicle during a subsequent step of the alignment sequence with the trailer.
Figure 7:
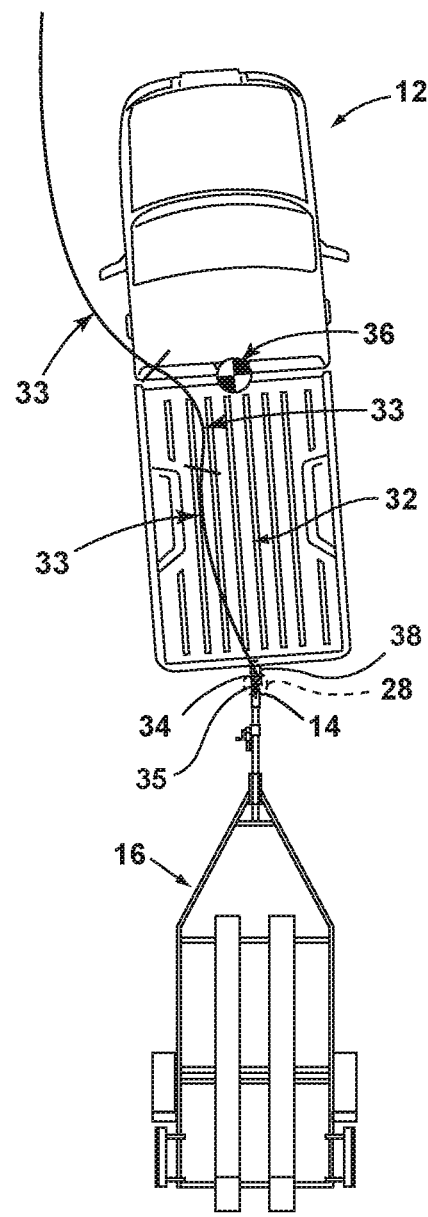
FIG. 7 is an overhead schematic view of the vehicle during a subsequent step of the alignment sequence with the trailer and showing the position of a hitch ball of the vehicle at an end of a derived alignment path.

Turning now to FIGS. 4-7, once the trailer 16 and coupler 14 have been identified, and system 10 determines the path 32 to align hitch ball 34 with the coupler 14, the operating routine 68 may continue to guide vehicle 12 until hitch ball 34 is positioned relative to coupler 14 for coupler 14 to engage with hitch ball 34 when coupler 14 is lowered into horizontal alignment therewith. In the example discussed above, image processing routine 64 continuously monitors the positioning $D_c$, $\alpha_c$ of coupler 14, constantly or once available, during execution of operating routine 68, including as coupler 14 comes into clearer view of rear camera 48, as shown in FIG. 5, with continued movement of vehicle 12 along path 32, as shown in FIG. 6. As discussed above, the position of vehicle 12 can also be monitored by dead reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle $\alpha_c$ information due to closer resolution or additional image data), including as vehicle moves closer to trailer 16, as shown in FIG. 6. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupler 14 to converge the known relative position of hitch ball 34 to the desired position 38d thereof relative to the tracked position 28 of coupler 14, as discussed above and shown in FIG. 7.

Figure 8:
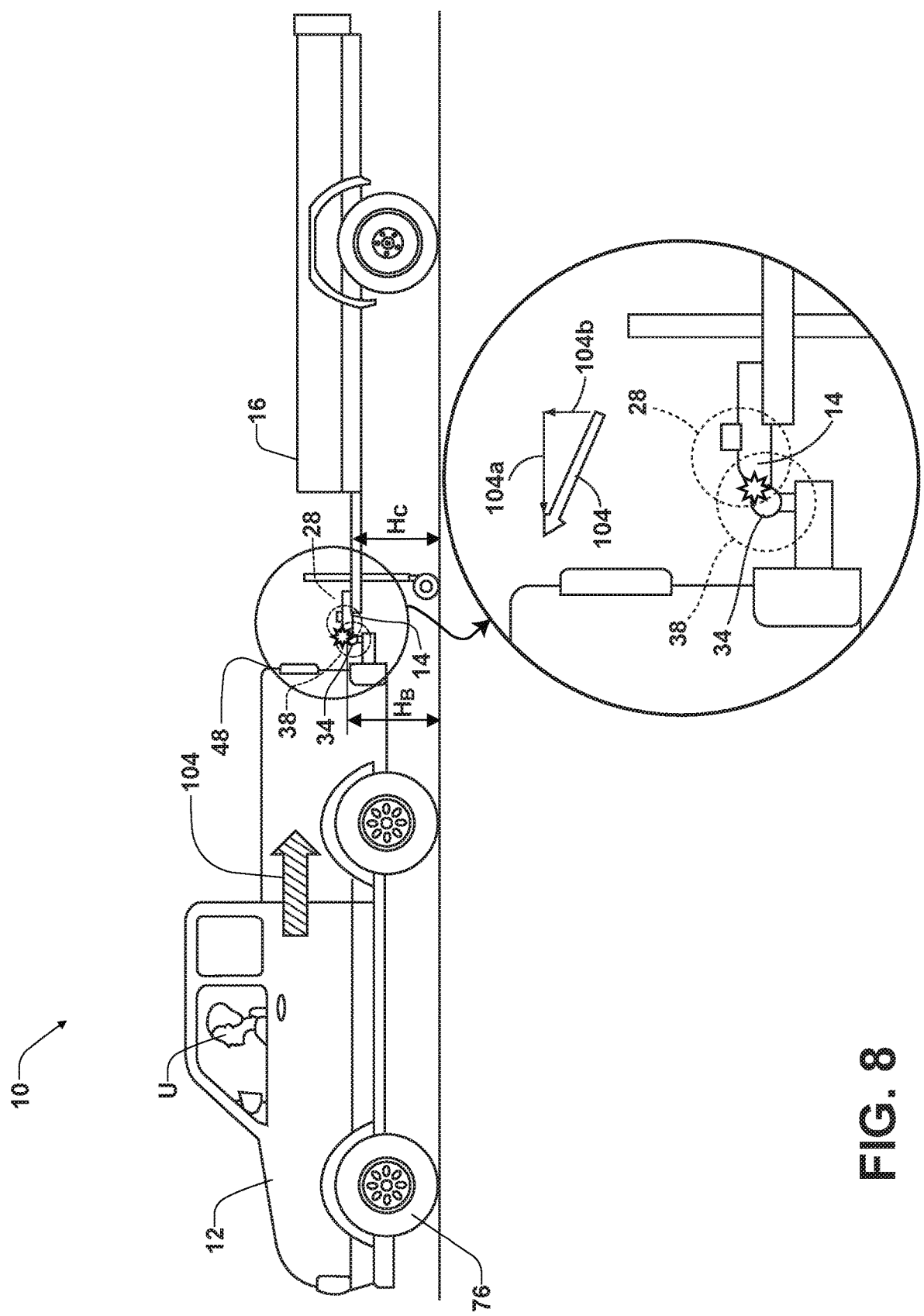
FIG. 8 is a side view of the vehicle operating in a rearward direction approaching the trailer.

Referring now to FIG. 8, a schematic diagram of the vehicle 12 moving toward the trailer 16 in reverse is shown. In some embodiments, the system 10 may be configured to detect vehicle behavior indicating a potential collision during such reversing operation under control of system 10. In the illustrated example, the vehicle behavior can indicate a collision between hitch ball 34 and trailer 14, which may occur due to an inaccuracy in the determination of the coupler height Hc, discussed above, or a condition where coupler 14 is otherwise too low to complete a hitching operation, including where system 10 is not configured to detect the coupler height Hc or wherein such detection is disabled. In other examples, the same operation can detect collision between vehicle 12 and another object in the reversing path of vehicle 12. In either example, upon a potential collision being detected, it is desirable for vehicle 12 to be brought to a stop as quickly as possible, to prevent damage to vehicle 12, any surrounding objects, and to trailer 16, as well as to prevent a situation where continued operation of operating routine 68 causes a situation wherein vehicle 12 "chases" a coupler 14 being pushed backward by vehicle 12. In this manner, the potential collision may occur under controlled conditions wherein the operating speed of the vehicle 12 is limited by the controller 26. Accordingly, the effect of the collision may be mitigated by the system 10 such that the vehicle 12 and/or the trailer are not damaged and the trailer is not significantly relocated as a result of an actual collision. In particular, system 10, as discussed further below, can be configured to detect a potential collision, to check for the absence of one or more additional vehicle states that may provide a false collision indication, and in the absence of such additional vehicle states, quickly bring vehicle 12 to a stop by actuation of the service brakes 71. As also discussed below, system 10 may take additional measures after vehicle 12 is brought to a stop in an attempt to maintain vehicle 12 in the stopped position without inadvertent subsequent movement.

Figure 9:
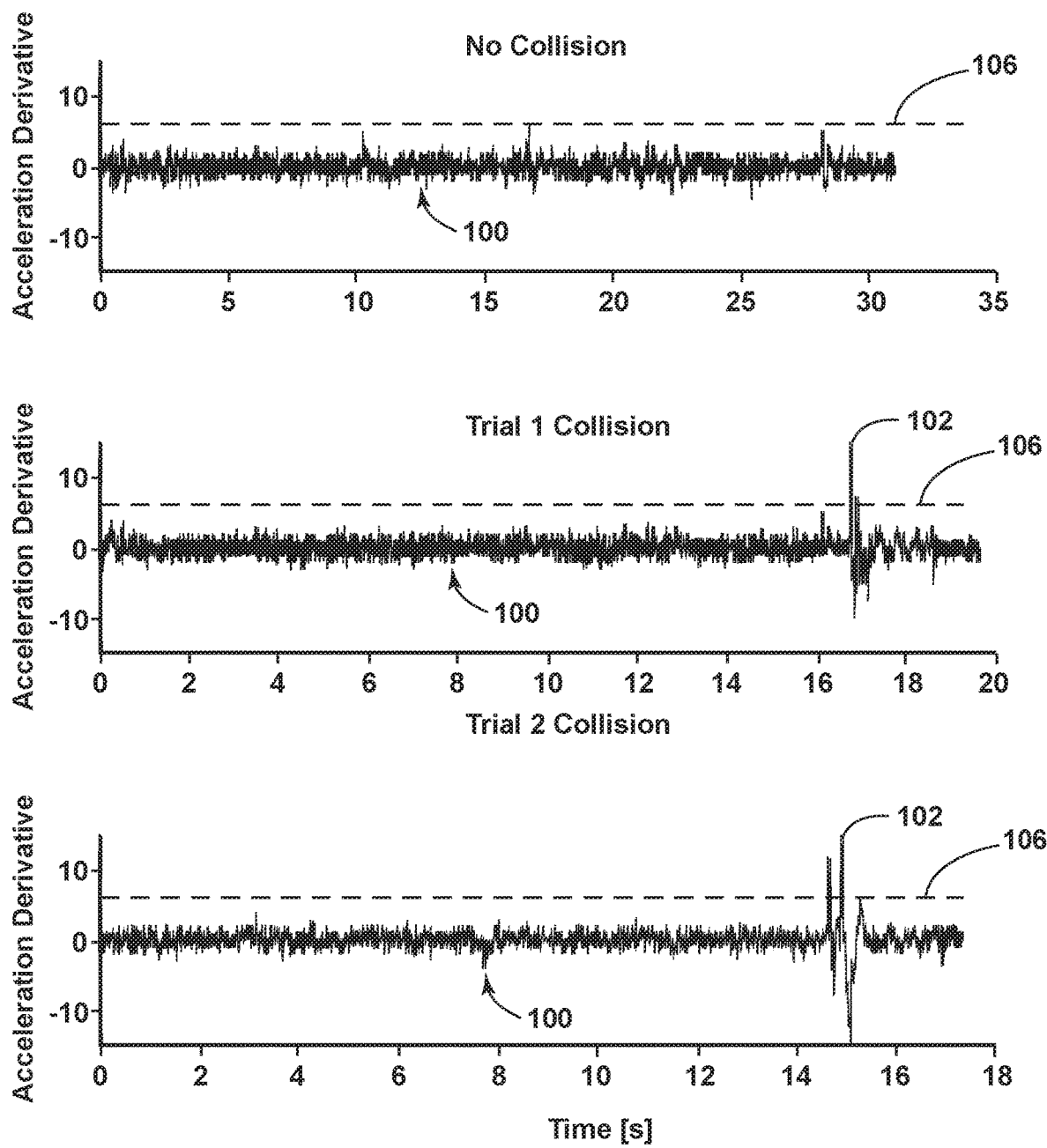
FIG. 9 are plots of processed vehicle acceleration data showing an indication of a potential collision.

In particular, controller 28 may implement a collision detection routine 86 using data obtained from an accelerometer 90 mounted within vehicle 12. For example vehicle 12 may include an accelerometer 90 for various purposes, including use within other vehicle systems, such as brake system 70 or the like. In this manner, controller 28 can be placed in communication with accelerometer 90 and can use the accelerometer data to detect the potential collision indication mentioned above. As shown in FIG. 9, during reversing of vehicle 12 by controller 26 executing operating routine 68, controller 28 may also implement the collision detection routine 86 including calculating a time derivative of the vehicle 12 acceleration, as communicated by the signal received from accelerometer 90, on an ongoing (continuous) basis. During normal implementation of the operating routine 68, the time derivative profile 100 represents a change in the acceleration of vehicle and may be (depending on the tuning of various operating characteristics of system 10, controller 26, and operating routine 68, as well as various vehicle 12 and trailer 16 characteristics) less than 5 m/s$^3$. As further shown in FIG. 9, a collision will cause a rapid change 94 in the vehicle 12 acceleration data because of the force 104 applied, for example by coupler 14 on hitch ball 34, including greater than 5 m/s$^3$ and in various examples up to about 10 m/s$^3$ or greater. In this respect, it is noted that the time-derivative will be positive when vehicle 12 undergoes a rapid change in acceleration regardless of whether the actual increasing deceleration of vehicle 12 in the reversing direction is based on a measurement characterized as positive or negative acceleration. In this manner, the measurements and limits discussed herein are applicable for systems that measure the vehicle 12 velocity in reversing as a positive, negative, or absolute value. Collision detection routine 86 may, thusly, be configured to identify a potential collision from the acceleration data when the time derivative of the vehicle 12 acceleration exceeds a predetermined value 106, for example, 6 m/s$^3$. In various other examples, the set point for potential collision identification may be tuned for the particular characteristics of system 10 and vehicle 12 such that various values between 5 m/s$^3$ and 10 m/s$^3$ may be used, along with other values that may be determined based on the characteristics of the particular vehicle 12 or system 10.

Because the use of acceleration data is an indirect way of detecting a potential collision, detection routine 86 may be configured to mitigate false detection by monitoring additional characteristics or conditions of vehicle 12, in particular, for states that may also affect the acceleration of vehicle 12 in a way that would also cause a rapid change in vehicle acceleration. It is noted that the general process discussed herein may be used for collision detection in a number of different scenarios, including during normal driving, during control of vehicle 12 by various additional autonomous driving systems or routines, or for collision with other objects during execution of operating routine 68, in which case the particular additional false detection characteristics or indicators may be similarly used to monitor for such false collision detection. In general, the controller 26 continuously tracks the location of coupler 14 during execution of operating routine 68. Further, as discussed above, either or both of path derivation routine 66 and operating routine 68 may monitor for other objects in the area surrounding and generally between vehicle 12 and trailer 16 and may generate or adjust path 32 to steer vehicle 12 around such objects, thereby negating the need to detect a collision with such objects. Accordingly, in one implementation, controller 26 may limit use of collision detection routine 86 (e.g., to decrease power consumption and to maintain available processing capability for operating routine 68) to situations in which a collision with a coupler 14 positioned at a low height Hc may actually occur. For example, in one implementation, controller 26 may only activate collision detection when coupler 14 is determined to be within a predetermined distance of hitch ball 34 (or, more simply, of the rear of vehicle 12). In one example, such a predetermined threshold distance may be one meter, although other predetermined distances may be set, depending on the characteristics of vehicle 12 in general and of system 10.

Figure 10:
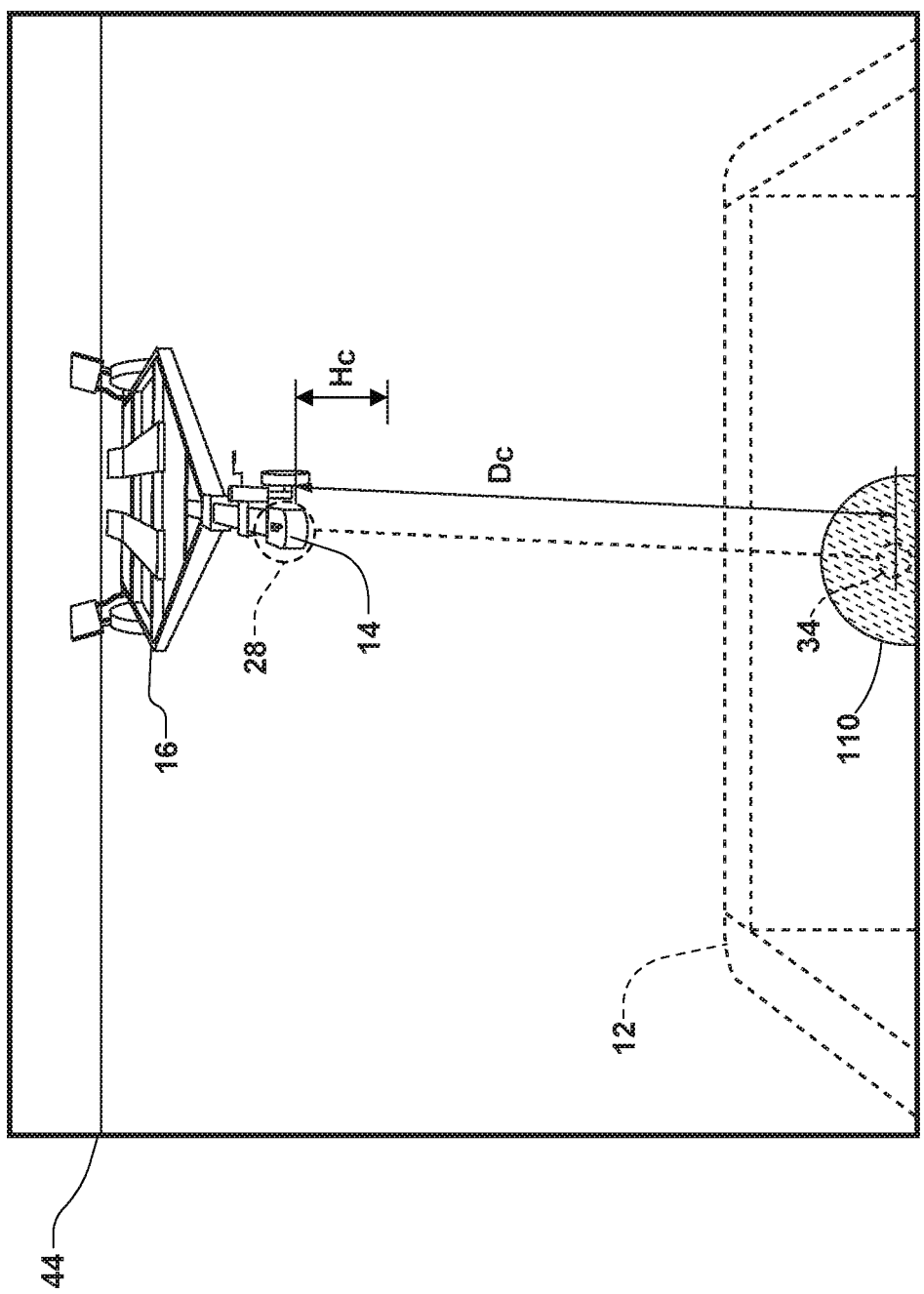
FIG. 10 is a projected view of image data demonstrating a alignment sequence with the trailer.
Figure 11:
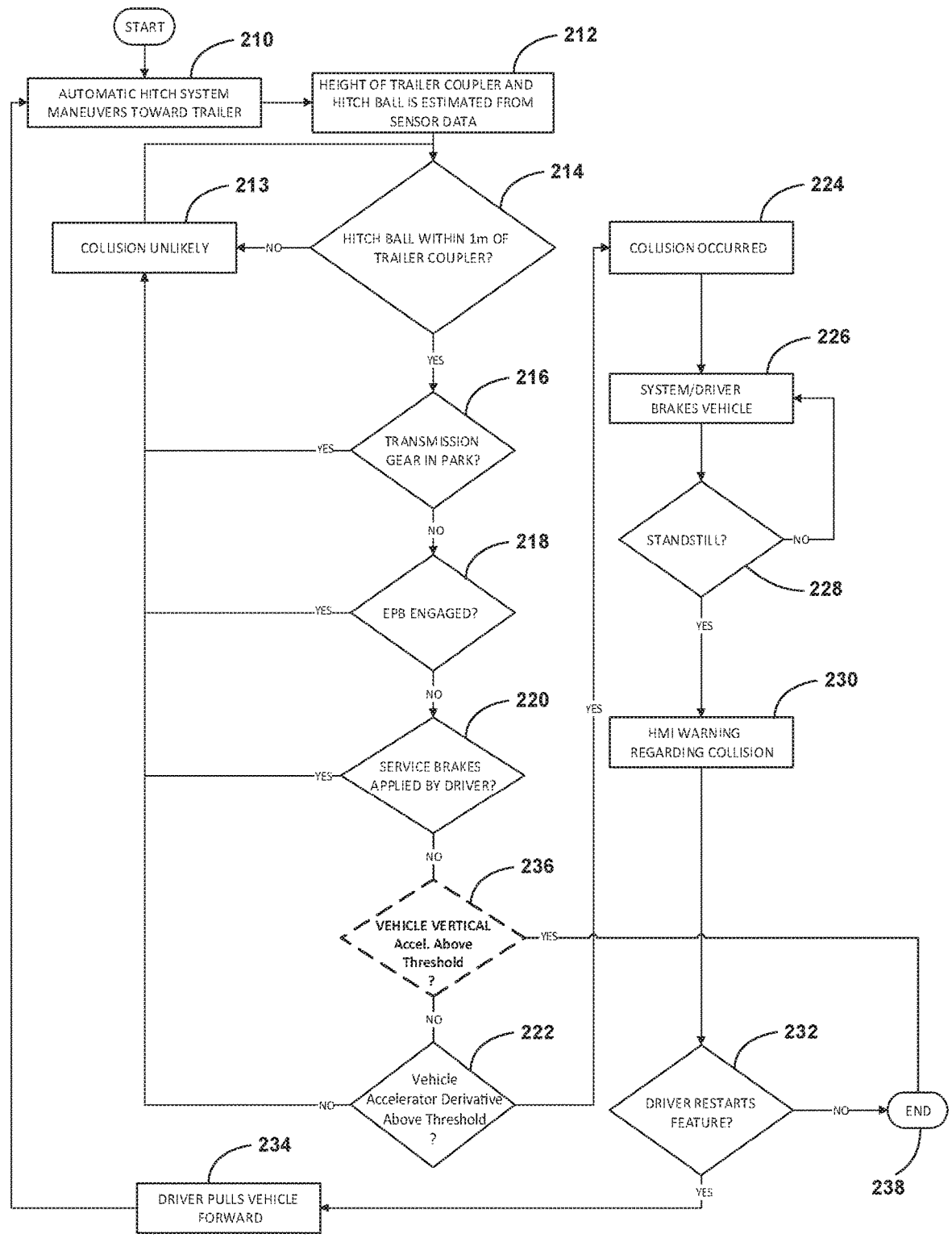
FIG. 11 is a flowchart depicting a method for detecting a potential collision between the vehicle and the trailer while the vehicle is operating in a rearward direction approaching the trailer in an alignment sequence and determining if potential false collision indications are present.

FIG. 10 demonstrates image data that may be captured by one or more of the cameras 48,50,52a,52b of the imaging system 18. Referring now to FIGS. 10 and 11, the system 10 may be configured to process the image data from one or more cameras to 48,50,52a,50b identify the coupler 14 and to derive the path 32 to align the vehicle hitch ball 34 with coupler 14. Once such a path has been derived, controller 26 implements operating routine 68 (step 210). As discussed as a part of the initial determination of the position 28 of coupler 14, the height Hc of coupler 14 may be estimated using the image data from the one or more cameras 48,50, 52a,52b and/or data from a radar unit 55 included with vehicle 12. Additionally, system 10, in some implementations, may continue to estimate the height Hc of coupler 14 as the position 28 of coupler 14 is continued to be tracked during execution of operating routine 68 (step 212). In this manner, if it is determined that the height Hc of coupler 14 is too low such that the hitch ball 34 cannot move beneath coupler 14, controller 26 can present a warning or indication to the user. However, in some instances, the ability of system 10 to reliably determine the height Hc of coupler using the image data or the radar 55 data may be limited by inaccuracies in such data, making it desirable to use the above-described collision detection routine to limit the effects of a collision between hitch ball 34 and coupler 14, should such a collision occur. Further, in some instances, it may be determined that the ability of system 10 to determine the height Hc of coupler 14 using image or radar 55 data is too low to be useful to a user such that the above-described warning functionality is disabled, meaning that collision detection routine 86 is used to limit the effects of a collision.

During operation (step 210), the controller 26 may adjust an operating speed of the vehicle 12 in response to the hitch ball 34 approaching coupler 14. For example, the controller 26 may slow the vehicle 12 to an approach speed in response to the hitch ball 34 being within a proximity 110 of the coupler position 28. The proximity 110 may be a pre-configured or predetermined distance between a known or approximated hitch ball 34 position and the position 28 of coupler 14, as identified by the controller 26. In this way, the controller 26 may control the hitch alignment sequence to automatically control the vehicle 12 to decrease an operating speed as the hitch ball 34 approaches the coupler position 28. In this manner, the above-discussed predetermined distance for activation of collision detection routine 86 may correspond with proximity 110. Accordingly, as further shown in FIG. 11, when controller 26 determines (step 214) that coupler 14 is outside of proximity 110 (or another established predetermined distance), it may determine that a collision is unlikely (step 213) such that collision detection routine 86 remains inactive. In a similar manner, as discussed above, controller 28 also monitors additional vehicle conditions that affect the acceleration of vehicle 12 such that a false collision indication may occur. In particular, if the vehicle 12 transmission 92 is shifted into park, vehicle 12 may exhibit a rapid change in acceleration (i.e. rapid deceleration) such that controller 28 monitors the transmission 92 (step 216) and similarly keeps collision detection routine 86 inactive (or deactivates collision detection routine 86, if coupler is within proximity 110) if the vehicle 12 is or moves into park. Further, controller 28 monitors a vehicle 12 electronic parking brake 98 (step 218) and similarly deactivates or keeps inactive the collision detection routine 86 if the parking brake is active or becomes activated. Similarly, controller 28 can also monitor the vehicle service brakes 99 for application by user (that may be in addition to application called for by operating routine 68 under normal circumstances, including to slow vehicle 12 when coupler 14 is within proximity 110), including above a predetermined threshold to an extent that a rapid change in acceleration may be induced resulting in a false collision detection (step 220) and may similarly disable or keep inactive the collision detection routine 86 in such a state. Other systems or vehicle devices that may affect acceleration of vehicle 12 in a similar manner may be similarly monitored.

In the example of the flowchart of FIG. 11, controller 26 disables or keeps inactive the collision detection routine 86, if any of the monitored vehicle systems or devices, but in other implementations when coupler 14 is determined to be within proximity 110, controller 26 can activate collision detection routine 86 to continuously monitor the data from accelerometer 90 for a spike 102 indicating a potential collision that can be subsequently disregarded if one of the additional monitored systems or devices is triggered, indicating that the spike 102 does not indicate a collision. In either scheme, if it is determined (in step 222) that a spike 102 in the time derivative of the acceleration data exceeds the threshold in the absence of any of the false-reading characteristics discussed above, it may be determined (step 224) that a collision has occurred (which may be ongoing). In response to such a collision detection, system 10 can send a signal to brake system 70 directing the application of the vehicle service brakes 71 to bring vehicle 12 to a stop (step 226). In one implementation, to provide for fast implementation of braking in the instance of a collision, controller 28 may be in direct communication with brake system 70 for controller 28 to transmit an application signal directly to the brake system 70; however, it may be possible to achieve the desired stopping of vehicle by controller 28 communicating with brake system 70 through the powertrain system 72 or through the engine control unit ("ECU"). In either mode of communication, the direction to actuate the service brakes 71 can be in the form of a brake torque demand signal that can request both a high braking torque (e.g., at least about 80% of the maximum brake torque) and high ramp up of the requested brake torque (again, at least about 80% of the maximum ramp-up rate). In another implementation, system 10 can present a warning to the user (including via HMI 40) and alert the driver to apply the service brakes 71.

After it has been determined (step 228) that the vehicle has been brought to a stop by application of the service brakes 71, controller 28 can present a warning to the user (step 230) that a collision has taken place and can take additional steps to prevent further movement of vehicle 12, as any additional movement of vehicle 12 that could cause any further movement of trailer 16 is to be prevented. In this respect, controller 26 can either continue to direct application of the service brakes 71 or can cause the electronic parking brake 98 to activate. Additionally or alternatively, controller 28 can cause vehicle 12 to shift the transmission system 92 to park. If either the emergency brake 98 or transmission 92 are used to maintain a standstill for vehicle 12, controller, 28 upon confirming that such device is active, can release the service brakes 71. In connection with the above-mentioned warning message, controller 28 can give the user the option to restart the hitching operation (step 232), either by manually applying the service brakes and placing the vehicle in drive and releasing the parking brake 98 (as applicable) and driving the vehicle forward (step 234, including to position coupler 14 beyond a minimum distance from vehicle 12) before reactivating operating routine 68.

As also shown in FIG. 11, controller 26 may also use vertical acceleration of vehicle 12, which may be detected by accelerometer 90 to determine a false collision reading (step 236). In particular, in various aspects, vehicle accelerometers can be configured to detect and measure both vertical and horizontal acceleration separately and to output separate, corresponding signals. In the example of a system 10 in use within a vehicle 12 having an accelerometer 90 with such functionality, controller 26 may receive signals from accelerometer 90 associated with both the horizontal and vertical acceleration of vehicle 12. Such a system 10 can feed the horizontal acceleration data/signal to the collision detection routine 86 to monitor such data for spikes 94 indicating a potential collision, as discussed above, while using the vertical acceleration data (within collision detection routine 86 or otherwise) for an additional characteristic indicating that a detected spike 102 in the horizontal acceleration data is not due to a collision. In particular, if the vertical acceleration exhibits a corresponding spike above a predetermined threshold, it may indicate that the spike 102 in the horizontal acceleration was due to vehicle 12 encountering a bump or other obstacle irregularity in the terrain traversed by vehicle 12. It is noted that a collision between hitch ball 34 and coupler 14 may produce a component 104a of the force 104 in a vertical direction in addition to the horizontal direction 104b that, as discussed above, results in the spike 102 in the horizontal acceleration time derivative, due to a glancing collision between hitch ball 34 and coupler 14. In general, such a force component 104a will be applied over a longer time than the horizontal component 104b such that any spike in a time derivative of the vertical acceleration signal will be relatively low. Accordingly, a predetermined threshold value for the vertical acceleration time derivative is also set at level proportionate to the horizontal threshold value such that any false collision detections are accurate.

As shown in FIG. 11, the vertical acceleration data can be used in a similar manner as the other system 10 data monitored by controller 28 for detecting a false collision indication. In this respect, such a false collision indication can be used to deactivate collision detection routine 86 or to indicate to controller 28 that any commensurate spikes 94 in the acceleration time derivative should be disregarded as not indicating a collision. Further, controller 28, upon detecting a spike in the vertical acceleration data (i.e., in a time derivative thereof), can end (step 226) the operating routine 68, as a bump, drop, or other event resulting both vertical and horizontal acceleration spikes may disrupt operating routine 68 to the extent that it may not continue. In such an instance, however, the additional collision mitigation or recovery steps discussed above may not be necessary and may be bypassed by controller 28 (step 238).

Figure 12:
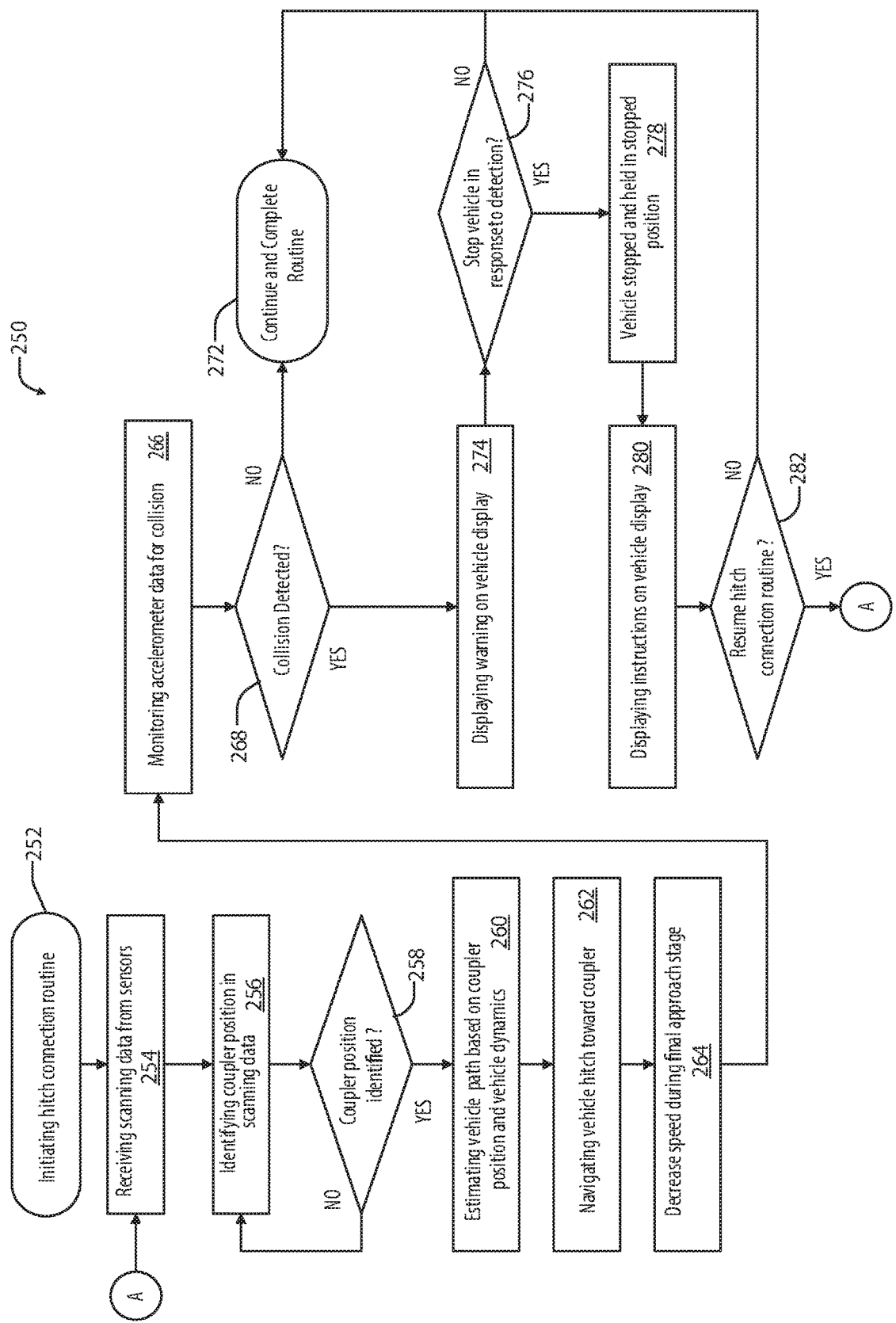
FIG. 12 is a flowchart depicting steps in the alignment sequence.

Referring now to FIG. 12, a flowchart is shown demonstrating a method 250 for operating the system 10 in conjunction with the collision detection routine 86, discussed above. The method 250 may begin by initiating a hitch connection routine (step 252). The hitch connection routine may begin by activating the imaging system 20 such that the controller 26 receives scanning data from one or more of the cameras 48,50,52a,52b, as well as proximity sensors 54 and radar 55 (step 254). Based on the scanning data or image data, the controller 26 may identify the coupler 14 of the trailer 16 in the scanning data (step 256). With the scanning data, the controller 26 may apply the image-processing routine 68 to identify the coupler position 28 (step 258). If the coupler position 28 is not identified, the method 250 may return to step 256. However, if the coupler position 28 is identified, the method 250 may continue by estimating the vehicle path 32 based on the coupler position 28 and the dynamics of the vehicle 12 (step 260).

Once the vehicle path 32 is identified, the controller 26 may navigate the vehicle 12 such that the hitch ball 34 is aligned with the coupler position 28 (step 262). As the hitch ball 34 approaches the coupler position 28 within the proximity 110, the controller may adjust or decrease an operating speed of the vehicle 12 providing for a slow and controlled approach during a final approach stage of the vehicle path 32 (step 264). Throughout the navigation of the vehicle 12 through the vehicle path 32 and particularly during the final approach stage, the controller 26 may monitor data communicated by the accelerometer 90 (step 266). Based on the data communicated by the accelerometer 90, the controller 26 may identify a collision between the coupler 14 and the hitch ball 34, according to the scheme and variations illustrated in FIG. 11 and discussed further above. Based on the data communicated by the accelerometer 90, if a collision is detected in step 268, the controller 26 may display a warning of the collision on the display 44 (step 274) and may cause the vehicle 12 to stop in response to the collision (step 276), as discussed further above. As long as no collision is detected, the controller 26 may continue to complete the hitch connection routine.

If the vehicle 12 is stopped and held in step 278, the controller 26 may display instructions on the display 44 identifying that the user U must exit the vehicle and increase the height of the coupler 14 (280). In some embodiments, the instructions may also be displayed on the portable device 96. Additionally, the HMI 40, which may be embodied by the touchscreen 42 and/or the portable device 96, may display a prompt in step 282 requesting authorization to continue the hitch connection routine. If the user U does not continue the hitch connection routine, the method may continue to step 272 to cancel or complete the routine. If the user U identifies that the hitch connection routine should resume in step 282, the method may return to step 252 to scan data from the sensors (e.g., the imaging system 18) and identify the coupler position 24. Accordingly, the method 250 may provide for an intuitive and convenient method to complete the hitch connection routine and prompt the user U to adjust the height of the coupler 14 as necessary.

The specific detailed steps discussed in reference to the various embodiments and methods described herein are examples provided to demonstrate some useful applications of the systems and devices disclosed by the application. It shall be understood that the collision detection routine 86 and each of the corresponding related elements implemented to complete the various methods discussed herein are provided as exemplary illustrations of the disclosure. Accordingly, the detailed embodiments shall not be considered limiting to the scope of the disclosure.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle system, comprising:
   a brake system within the vehicle and including vehicle service brakes configured to decelerate the vehicle to a stop;
   an accelerometer mounted on the vehicle; and
   a controller:
      positioned within the vehicle;
      receiving a first signal from the accelerometer; and
      during an automated hitching operation of the vehicle, including reversing of the vehicle in a longitudinal direction toward a trailer from an initial distance between the trailer and the vehicle in the longitudinal direction, transmitting an actuation signal to the brake system within the vehicle to cause actuation of the vehicle service brakes when the first signal from the accelerometer indicates a deceleration in the longitudinal direction above a predetermined rate within a predetermined time interval.

2. The system of claim 1, wherein the controller calculates a time derivative of the first signal from the accelerometer during reversing of the vehicle and monitors the time derivative on an ongoing basis and determines that the first signal from the accelerometer indicates the deceleration in the longitudinal direction above the predetermined rate by the time derivative exceeding a predetermined value.

3. The system of claim 2, wherein the predetermined value of the time derivative is between 5 meters per second cubed and 10 meters per second cubed.

4. The system of claim 1, wherein:
   the controller interprets the deceleration in the longitudinal direction above a predetermined rate within a predetermined time interval as a reversing collision indication; and
   the controller further monitors at least one additional vehicle state affecting the signal from the accelerometer for an indicator of false positive detection.

5. The system of claim 4, wherein:
   the accelerometer outputs a second signal corresponding with acceleration of the vehicle in a vertical direction; and
   the controller receives the second signal and monitors for the at least one additional vehicle state by monitoring the second signal for an indication of an acceleration in the vertical direction above a predetermined rate within the predetermined time interval such that the acceleration in the vertical direction above the predetermined rate within the predetermined time interval indicates a false positive detection.

6. The system of claim 5, further including at least one of a transmission system and an electronic parking brake, wherein:
the at least one additional vehicle state includes at least one of the transmission system being in park, the electronic parking brake being active, or the vehicle brake system being applied above a predetermined threshold.

7. The system of claim 1, wherein the actuation signal requests at least one of a braking actuation rate or a braking torque above a respective predetermined threshold.

8. The system of claim 1, wherein the controller continues to transmit the actuation signal to the vehicle brake system until the vehicle is brought to a stop.

9. The system of claim 8, further including an electronic parking brake, wherein:
the controller determines that the vehicle is brought to a stop and causes application of the electronic parking brake.

10. The system of claim 1, further including an imaging system, wherein the controller further:
identifies a trailer coupler disconnected with, spaced from the vehicle, and within image data received from the imaging system; and
outputs a steering signal to the vehicle during reversing of the vehicle to cause the vehicle to steer to align a hitch ball of the vehicle with the coupler.

11. The system of claim 10, wherein the controller further:
continuously monitors a distance between a rear of the vehicle and the coupler while outputting the steering signal to the vehicle;
transmits the actuation signal to the vehicle brake system when the first signal from the accelerometer indicates the deceleration in the longitudinal direction above the predetermined rate within the predetermined time interval within a reverse collision detection function; and
implements the reverse collision detection function only when the distance between the rear of the vehicle and the coupler is within one meter.

12. The system of claim 11, wherein the controller uses the first signal from the accelerometer indicating the deceleration in the longitudinal direction above the predetermined rate within the predetermined time interval within the reverse collision detection function as an indication of a collision between the hitch ball and the coupler.

13. A vehicle hitching assistance system, comprising:
a hitch mounted on the vehicle;
a vehicle brake system within the vehicle and including vehicle service brakes configured to decelerate the vehicle to a stop;
a vehicle steering system including steered vehicle wheels connected with the vehicle service brakes;
an accelerometer mounted on the vehicle; and
a controller:
identifying a trailer coupler disconnected from the hitch, spaced from the vehicle, and within a specified area relative to the vehicle;
outputting a steering signal to the vehicle steering system to steer to align a hitch ball of the vehicle with the coupler;
receiving a first signal from the accelerometer; and
during an automated hitching operation of the vehicle, including reversing of the vehicle in a longitudinal direction toward the trailer from an initial distance between the trailer and the vehicle in the longitudinal direction, transmitting an actuation signal to the brake system to cause actuation of the vehicle service brakes when the first signal from the accelerometer indicates a deceleration in the longitudinal direction above a predetermined rate within a predetermined time interval.

14. The system of claim 13, wherein the controller further:
continuously monitors a distance between a rear of the vehicle and the coupler while outputting the steering signal to the vehicle;
transmits the actuation signal to the vehicle brake system when the first signal from the accelerometer indicates the deceleration in the longitudinal direction above the predetermined rate within the predetermined time interval within a reverse collision detection function; and
implements the reverse collision detection function only when the distance between the rear of the vehicle and the coupler is within one meter.

15. The system of claim 14, wherein the controller infers the first signal from the accelerometer indicating the deceleration in the longitudinal direction above the predetermined rate within the predetermined time interval within the reverse collision detection function as a collision between the hitch ball and the coupler.

16. The system of claim 13, wherein the controller calculates a time derivative of the signal from the accelerometer during reversing of the vehicle and monitors the time derivative on an ongoing basis and determines that the signal from the accelerometer indicates a deceleration in the longitudinal direction above the predetermined rate by the time derivative exceeding a predetermined value.

17. The system of claim 13, wherein:
the controller interprets the deceleration in the longitudinal direction above a predetermined rate within a predetermined time interval as a reversing collision indication; and
the controller further monitors at least one additional vehicle state affecting the signal from the accelerometer for an indicator of false positive detection.

18. The system of claim 17, wherein:
the accelerometer outputs a second signal corresponding with acceleration of the vehicle in a vertical direction;
the controller receives the second signal and monitors for the at least one additional vehicle state by monitoring the second signal for an indication of an acceleration in the vertical direction above a predetermined rate within the predetermined time interval such that the acceleration in the vertical direction above the predetermined rate within the predetermined time interval indicates a false positive detection.

19. The system of claim 18, further including at least one of a transmission system and an electronic parking brake, wherein:
the at least one additional vehicle state includes at least one of the transmission system being in park, the electronic parking brake being active, or the vehicle brake system being engaged above a predetermined threshold.

20. A method for controlling a vehicle during reversing, comprising:
receiving a first signal from an accelerometer mounted with the vehicle; and
during an automated hitching maneuver of the vehicle in a longitudinal direction toward a trailer from an initial distance between the trailer and the vehicle in the longitudinal direction, transmitting an actuation signal from within the vehicle to a vehicle brake system when the first signal from the accelerometer indicates a deceleration in the longitudinal direction above a predetermined rate within a predetermined time interval, the signal causing application of service brakes within the vehicle to cause the vehicle to decelerate to a stop.

* * * * *